(12) United States Patent
Brandt et al.

(10) Patent No.: US 7,118,619 B2
(45) Date of Patent: Oct. 10, 2006

(54) USE OF SILICONE RESINS AS DISPERSANTS

(75) Inventors: Petra Brandt, Essen (DE); Kathrin Lehmann, Leverkusen (DE); Sascha Oestreich, Essen (DE); Cornelia Schröter, Krefeld (DE); Stefan Silber, Krefeld (DE)

(73) Assignee: Goldschmidt GmbH, Essen (DE)

( * ) Notice: Subject to any disclaimer, the term of this patent is extended or adjusted under 35 U.S.C. 154(b) by 137 days.

(21) Appl. No.: 10/763,031

(22) Filed: Jan. 22, 2004

(65) Prior Publication Data

US 2004/0152828 A1 Aug. 5, 2004

(30) Foreign Application Priority Data

Jan. 24, 2003 (DE) ................. 103 02 743

(51) Int. Cl.
*C09D 11/00* (2006.01)

(52) U.S. Cl. .............. 106/31.6; 106/31.89; 428/405; 528/29

(58) Field of Classification Search ........... 106/31.27, 106/31.43, 31.36, 31.51; 524/86, 95, 104, 524/420, 422, 424, 430, 266, 268; 525/446; 528/25, 29, 37

See application file for complete search history.

(56) References Cited

U.S. PATENT DOCUMENTS

| | | | |
|---|---|---|---|
| 3,044,979 A | | 7/1962 | Saville |
| 4,452,961 A | * | 6/1984 | Koerner et al. ............ 528/26 |
| 5,349,021 A | * | 9/1994 | Rooney et al. ............ 524/761 |
| 5,418,280 A | * | 5/1995 | Birkett ..................... 524/588 |
| 5,457,166 A | * | 10/1995 | Yoshikawa et al. ........ 525/446 |
| 6,329,460 B1 | * | 12/2001 | Ishikawa et al. .......... 524/506 |
| 6,683,130 B1 | * | 1/2004 | Kessell .................... 524/588 |
| 2004/0214977 A1 | * | 10/2004 | Dietz et al. ............... 528/33 |

FOREIGN PATENT DOCUMENTS

| | | |
|---|---|---|
| DE | 2 232 419 | 9/1973 |
| DE | 25 21 170 | 11/1975 |
| DE | 28 28 990 C2 | 11/1982 |
| DE | 29 49 725 C2 | 4/1983 |
| DE | 32 14984 A1 | 11/1983 |
| DE | 3412 648 C2 | 6/1987 |
| EP | 0 159 678 A1 | 10/1985 |
| EP | 0 154 678 B2 | 8/1987 |
| EP | 0 438 836 A1 | 7/1991 |
| EP | 0 879 860 B1 | 8/2002 |
| WO | WO 99/56864 | 11/1999 |
| WO | WO 00/24503 | 5/2000 |

* cited by examiner

*Primary Examiner*—Marc S. Zimmer
(74) *Attorney, Agent, or Firm*—Frommer Lawrence & Haug LLP

(57) ABSTRACT

The invention provides for the use of silicone resins obtainable by reacting
  a) an alkoxysiloxane of the general formula $$R^2_a Si(OR^1)_b O_{\frac{4-(a+b)}{2}}$$

with
  b) one or more hydroxyl-containing polyesters,
and if desired
  c) one or more low molecular weight alcohols,
it being possible for the alkoxysilane to be reacted partially and completely, based on the amount of (OR$^1$) groups in a), but the reaction being taken at least to the point where a clear solution is obtained, as dispersants for solids for producing coatings, printing inks and/or print varnishes.

20 Claims, No Drawings

USE OF SILICONE RESINS AS DISPERSANTS

RELATED APPLICATIONS

This application claims priority to DE 103 02 743.2, filed Jan. 24, 2003, herein incorporated by reference.

BACKGROUND OF THE INVENTION

1. Field of the Invention

The invention relates to the use of silicone resins as dispersants for solids.

For the dispersing of solids (e.g., fillers or pigments) in liquid media it is regular practice to make use of dispersants in order to achieve effective dispersing of the solids, to reduce the mechanical shear forces required for dispersing, and at the same time to realize very high degrees of filling. The dispersants assist the disruption of agglomerates, as surface-active materials wet and/or cover the surface of the particles to be dispersed, and stabilize said particles against unwanted reagglomeration.

In the production of inks and paints dispersants facilitate the incorporation of solids, such as fillers and pigments, for example, which, as important formulating ingredients, are essential determinants of the optical appearance and of the physicochemical properties of inks and paints. Optimum utilization requires firstly that these solids be distributed uniformly in the formulations and secondly that the state of distribution, once attained is stabilized.

2. Description of the Related Art

A host of different substances are nowadays used as dispersants for solids. In addition to very simple, low molecular mass compounds, such as lecithin, fatty acids and their salts, and alkylphenolethoxylates, for example, more complex structures, too, are used as dispersants. The use particularly of amino-functional and amido-functional systems is widespread here. WO-A-00/24503 describes, for example, dispersants based on polyester-modified polyamines. DE-A-1 97 32 251 describes salification products of polyamines and their use as dispersants for pigments and fillers. Furthermore, for example, WO-A-99/56864, EP-B-0 154 678, EP-A-0 159 678 and EP-A-0 438 836 describe dispersants based on polyurethanes. Additionally amino-functional and/or amido-functional poly-acrylates (EP-B-0 879 860) are used.

There is nevertheless a growing demand for solids dispersants which exhibit properties further improved over those of the prior art. The demand is for dispersants which have a very high stabilizing effect on a multiplicity of different solids. For example with more effective dispersants it is possible to reduce the amount of high-price pigments used without having to accept detractions in terms of color strength.

Moreover, for example the viscosity characteristics of inks and paints comprising solids, such as fillers and/or pigments, are critically codetermined by the dispersant used. The demand here is in particular for dispersants which result in a very low viscosity in the liquid inks and paints and also retain such a viscosity, preference being given to newtonian viscosity behavior.

OBJECTS OF THE INVENTION

It was therefore an object of the present invention to provide solids dispersants which exhibit an improved dispersing performance and which have a positive influence on the viscosity and rheology of formulations comprising solids.

DESCRIPTION OF THE INVENTION

Surprisingly it has now been found that the aforementioned object is achieved through the use of silicone resins which are obtained by reacting an alkoxy silane with one or more hydroxyl-containing polyesters and, if desired, with one or more low molecular mass alcohols.

The invention accordingly provides firstly for the use of silicone resins obtainable by reacting a) an alkoxysiloxane of the general formula

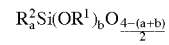

where
$R^1$ is a lower alkyl group preferably having up to 4 carbon atoms,
$R^2$ is an alkyl or phenyl group,
a is from 1.0 to 1.2,
b is from 0.5 to 1.0,
with the proviso that at least 50% by weight corresponds to the formula $[R^2Si(OR^1)O]_n$, n=3 to 8, with b) one or more hydroxyl-containing polyesters, and if desired c) one or more low molecular weight alcohols, it being possible for the alkoxysiloxane to be reacted partly or fully, based on the amount of $(OR^1)$ groups in a), but the reaction being taken at least to the point where a clear solution is obtained, as dispersants for solids.

Examples of the radicals $R^1$, are lower alkyl groups having up to 4 carbon atoms, preferably methyl, ethyl, propyl, isopropyl, and/or butyl radicals. The ethyl radical is particularly preferred.

Examples of the radicals $R^2$, are alkyl or phenyl groups, preferably alkyl radicals, such as the methyl, ethyl, propyl, isopropyl, butyl, hexyl, and octyl radical, and the phenyl radical. The phenyl radical is particularly preferred.

Hydroxyl-containing polyesters (b) for the purposes of the present invention are polyesters having at least two ester groups per molecule, which represent the reaction product of one or more at least difunctional carboxylic acids or their alkyl esters and/or their anhydrides with one or more polyhydric alcohols having at least two hydroxyl groups.

Hydroxyl-containing polyesters (b) for the purposes of the present invention can also be the reaction product of one or more polyhydric alcohols having at least two hydroxyl groups with one or more hydroxyl-functional carboxylic acids and/or their lactones.

Examples of at least difunctional carboxylic acids which can be used as one kind of the reactants in the preparation of hydroxyl-containing polyesters (b) are aliphatic dicarboxylic acids and/or their esters and/or their anhydrides, such as oxalic acid, succinic acid, glutaric acid, adipic acid, pimelic acid, suberic acid, sebacic acid, decanedicarboxylic acid, dodecanedicarboxylic acid, and 2,2,4-trimethyladipic acid, and unsaturated dicarboxylic acids, such as maleic acid and fumaric acid, and also aromatic dicarboxylic acids and/or their esters and/or their anhydrides, and/or polycarboxylic acids, such as phthalic acid, isophthalic acid, terephthalic acid, tetrahydrophthalic acid, methyltetrahydrophthalic acid, naphthalenedicarboxylic acids, trimellitic acid, dimethyl terephthalate, and 1,2,4,5-benzenetetracarboxylic acid.

Examples of hydroxyl-functional carboxylic acids and/or their lactones, which can be used as one kind of reactants in the preparation of hydroxyl-containing polyesters (b), are hydroxyl-functional carboxylic acids such as lactic acid, 3-hydroxypropionic acid, 3-hydroxybutyric acid, 4-hydroxybutyric acid, 5-hydroxyvaleric acid, 4-hydroxyvaleric acid, 6-hydroxyhexanoic acid, 4-hydroxyhexanoic acid, 5-hydroxydodecanoic acid, 12-hydroxydodecanoic acid, 12-hydroxyoctadecanoic acid, and ricinoleic acid (12-hydroxy-9,10-cis-octadecenoic acid) and lactones such as β-propiolactone, β-butyrolactone, γ-butyrolactone, 3,6dimethyl-1,4-dioxane-2,5-dione, δ-valerolactone, γ-valerolactone, ε-caprolactone, γ-caprolactone, 4-methylcaprolactone, 2-methyl-caprolactone and/or 5-hydroxydodecanolactone and 12-hydroxydodecanolactone.

Preference is given to hydroxylontaining polyesters having a molecular weight of from 100 to 10 000 g/mol. Particular preference is given to hydroxyl-containing polyesters having a molecular weight of from about 200 to about 5000 g/mol.

Examples of polyhydric alcohols having at least two hydroxyl groups, which can be used as the other kind of reactants in the preparation of hydroxyl-containing polyesters (b), are dihydric alcohols, such as ethylene glycol, propylene glycol, butanediol, hexanediol, diethylene glycol, dipropylene glycol, bisphenol A, bisphenol A ethoxylate, bisphenol A propoxylate, bisphenol F, bisphenol F ethoxylate, bisphenol F propoxylate; trihydric alcohols, such as trimethylolethane and trimethylolpropane; tetrahydric alcohols, such as pentaerythritol and ditrimethylolpropane; and hexahydric alcohols, such as sorbitol and dipentaerythritol.

Examples of low molecular weight alcohols (c) which can be used where appropriate as reactants in the preparation of the silicone resins, are monohydric alcohols, such as methanol, ethanol, propanol, isopropanol, 2-butanol, isobutanol, hexanol and dodecanol; dihydric alcohols, such as ethylene glycol, propylene glycol, butanediol, hexanediol, diethylene glycol and dipropylene glycol; trihydric alcohols, such as trimethylolethane and trimethylolpropane; tetrahydric alcohols, such as pentaerythritol and ditrimethylolpropane; hexahydric alcohols, such as dipentaerythritol and amino alcohols, such as 2-aminoethanol, 2-(2-aminoethylamino) ethanol, triethanolamine, diethanolamine, propanolamine, 2-amino-1,3-propanediol, 2-aminoisobutanol, aminohexanol, aminophenylethanol, and hydroxyethylpyridine.

Particularly preferred low molecular weight alcohols which can be used where appropriate as reactants in the preparation of the silicone resins are amino alcohols.

The preparation and the use of the hydroxyl-containing polyesters (b) and of the inventively co-used silicone resins as heat-curable binders is known and is described for example in U.S. Pat. No. 3,044,979, DE-B-22 32 419, DE-A-25 21 170, DE-C-28 28 990, DE-C-29 49 725, DE-A-32 14 984, and DE-C-34 12 648.

A solid for the purposes of the present invention can in principle be any solid organic or inorganic material which is insoluble in the coatings, printing inks and/or print varnishes and whose finely divided form is to be stabilized therein.

Examples of such solids are pigments, fillers, dyes, optical brighteners, ceramic materials, magnetic materials, metals, and biocides, agrochemicals, and drugs which are employed in dispersion form.

Preferred solids are pigments, as specified for example in the "Colour Index, Third Edition, Volume 3; The Society of Dyers and Colorists (1982)" and in the subsequent, revised editions.

Examples of pigments include inorganic pigments, such as carbon blacks, titanium dioxides, zinc oxides, Prussian blue, iron oxides, cadmium sulfides, chromium pigments, such as chromates, molybdates, and mixed chromates and sulfates of lead, zinc, bariumn, calcium and mixtures thereof.

Further examples of inorganic pigments are given in the book "H. Endriss, Aktuelle anorganische Bunt-Pigmente, Vincentz Verlag, Hannover (1997)".

Examples of organic pigments are those from the group of the azo, diazo, condensed azo, naphtol, metal complex, thioindigo, indanthrone, isoindanthrone, anthanthrone, anthraquinone, isodibenzanthrone, triphendioxazine, quinacridone, perylene, diketopyrrolopyrrole, and phthalocyanine pigments. Further examples of organic pigments are given in the book "W. Herbst, K. Hunger, Industrial Organic Pigments, VCH, Weinheim (1993)".

Further preferred solids are fillers, such as talc, kaolin, silicas, barytes, and lime; ceramic materials, such as aluminum oxides, silicates, zirconium oxides, titanium oxides, boron nitrides, silicon nitrides, boron carbides, mixed silicon-aluminum nitrides, and metal titanates; magnetic materials, such as magnetic oxides of transition metals, such as iron oxides, cobalt-doped iron oxides, and ferrites; metals, such as iron, nickel, cobalt, and the alloys thereof; and biocides, agrochemicals, and drugs, such as the fungicides, for example.

Particularly preferred solids are pigments, especially black pigments, such as carbon blacks (gas blacks), for example.

The invention secondly provides for the use of silicone resins as dispersants for solids for producing coatings, printing inks and/or print varnishes.

Coatings, printing inks and/or print varnishes for the purposes of the present invention can be any of a very wide variety of products. The systems involved may include, for example, fillers, pigments and/or dyes. As a liquid phase they may comprise organic solvents and/or water, such as is known as the state of the art as a function of the binders used. The coatings, printing inks and/or print vanishes need not, however, necessarily include a liquid phase, but can also be what are known as powder coating materials. Similarly, the coatings, printing inks and/or print varnishes may comprise the customary additives of the state of the art, such as wetting agents, leveling assistants or defoamers, etc., for example, and may cure, crosslink and/or dry in accordance with various prior art methods.

Coatings, printing inks and/or print varnishes for the purposes of the present invention can be produced by direct dispersion or using pigment pastes (full mixing and tinting). In the case of direct dispersion the complete pigment/filler mixture is dispersed in the binder, in the grinding charge, and the remaining components of the formulation are added subsequently.

In the case of preparation by way of pigment pastes (full mixing) pigments are first of all dispersed individually in a highly concentrated paste. This allows the dispersing operation to be adapted to the particular pigment in an optimum manner. Pigment pastes can be produced using special grinding resins or else without binder. The pastes are mixed with the finished formulated varnish, which includes all of the remaining paint components (binders, additives, solvents, etc.). These pigment pastes can also be used to tint finished white paints or for adjusting the shade of the finished color paints (as tinting pastes).

The invention accordingly also provides for the use of silicone resins as dispersants for solids in pigment pastes.

Examples of coatings for the purposes of the present invention are solvent-borne paints and inks, powder coating materials, UV-curable paints and inks, low solids, medium solids, and high solids coatings, automotive finishes, wood coatings, baking varnishes, two-component coating materials, metal coatings, and toner compositions. Further examples of coatings are given in the relevant technical literature.

Examples of printing inks and/or print varnishes for the purposes of the present invention are solvent-based printing inks, flexographic inks, gravure inks, letter press or relief printing inks, offset inks, lithographic inks, printing inks for printing packaging, screen printing inks, printing inks for ink jet printers, and print varnishes, such as overprint varnishes.

Examples of printing ink and/or print varnish formulations are given in "E. W. Flick, Printing Ink and Overprint Varnish Formulations—Recent Developments, Noyes Publications, Park Ridge N.J., USA (1990)".

Preferred examples of coatings, printing inks and/or print varnishes for the purposes of the present invention are radiation-curable coatings, printing inks and/or print varnishes, such as free-radically UV/EB-curable formulations (UV=ultraviolet radiation, EB=electron beams) or cationically UV/EB-curable formulations. Examples of radiation-curable coatings, printing inks and/or print varnishes for the purposes of the present invention are given in "C. Lowe, G. Webster, S. Kessel, I. McDonald, G. Rayner; Chemistry & Technology of UV & EB Formulation for Coatings, Inks & Paints, Volume 4—Formulation, Wiley/Sita, London, UK (1997)".

The silicone resins of the invention can be used in the coatings, printing inks and/or print varnishes in a concentration of from about 0.01 to about 10.0% by weight, preferably from about 0.5 to about 5% by weight. If desired they can be used as a mature with prior art wetting agents and dispersants.

EXAMPLES

The invention is illustrated below with reference to the following non-limiting examples.

As the silicone resins to be used in accordance with the invention, commercially available products were used. The products are obtainable under the following trade names from Tego Chemie Service GmbH, Essen: Silikophtal® HTF, Siikophtal® HTS, Silikophtal® HTL-2. The solvent present in the supply form of the product was removed by distillation and replaced by tripropylene glycol diacrylate (IPGDA) (35% by weight silicone resin in TPGDA).

Also used as dispersant was an amino-functional silicone resin. The product was prepared as follows:

In a 500 ml three-necked flask equipped with a stirrer, intensive condenser, thermometer and dropping funnel, 100 g (0.15 mol) of an alkoxysiloxane with the average formula:

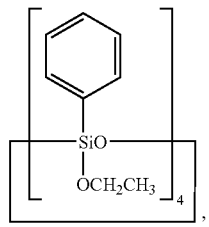

54 g (0.135 mol) of a hydroxyl-containing polyester having an OH number of 10 mol OH/kg with the average formula:

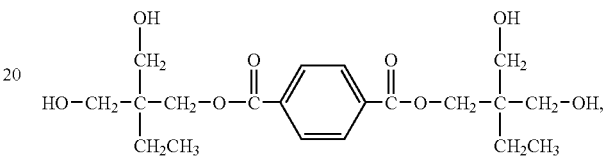

1.85 g (0.015 mol) of 2-(2-hydroxyethyl)pyridine, and 100 g of methoxypropyl acetate are mixed. 0.25 g of tetrabutyl titanate is added and the mixture is slowly heated to 140° C. During the heating operation ethanol is distilled off continuously. The reaction is ended as soon as the reaction mixture has lost its cloudiness. The product is yellow and viscous. The methoxypropyl acetate solvent is removed by distillation under reduced pressure and replaced by TPGDA (35% by weight of amino-functional silicone resin in TPGDA).

As prior art dispersants the following commercially available dispersants were used:

Solsperse® 24000 (Avecia Ltd.), Disperbyk® 168 (BYK-Chemie GmbH), Texaphor® P-61 (Cognis GmbH & Co.KG).

From the large number of possible solids the following commercially available pigments were selected:

Irgalite® Yellow BAW (Ciba); Raven® 450 (Columbia Chemicals Co.).

The dispersants and solids were compared in the following formulations for coatings, printing inks and/or print varnishes:

TABLE 1

Formulation for UV-curing flexographic ink

| Raw material | % by wt. |
|---|---|
| Ebecryl ® 812 (UCB) | 30 |
| Ebecryl ® 220 (UCB) | 9 |
| Laromer ® TPGDA (BASF) | 20 (yellow); 22 (carbon black) |
| Laromer ® TMPTA (BASF) | 13 |
| Dispersant (amount of active substance) | 3 |
| Pigment | 13 (yellow); 11 (carbon black) |
| Irgacure ® 1300 (Ciba) | 7 |
| Irgacure ® 819 (Ciba) (only in the case of yellow) | 1.6 |
| Darocure ® 1173 (Ciba) (only in the case of carbon black) | 1.6 |
| Airex ® 920 (Tego) | 1.5 |

The ratio of the amount of pigment to the amount of dispersing additive (pure active substance) was kept constant in all experiments.

Nonformulation solvents which entered into the initial weighing when commercial, solvent-containing dispersing additives were used were not taken into account, only the pure active substance fraction.

The amount of TPGDA introduced with the silicone resins used in accordance with the invention was taken into account accordingly in the overall formulation.

TABLE 2

Formulation for white, UV-curable tinting paint

| Raw material | % by wt. |
|---|---|
| Ebecryl ® 812 (UCB) | 30.00 |
| Ebecryl ® 220 (UCB) | 8.50 |
| Laromer ® TPGDA (BASF) | 19.25 |
| Laromer ® TMPTA (BASF) | 12.50 |
| Kronos ® 1075 (Kronos) | 25.50 |
| Irgacure ® 819 (Ciba) | 1.50 |
| Darocure ® 1173 (Ciba) | 1.50 |
| Airex ® 920 (Tego) | 1.25 |

The white, UV-curable tinting paint was prepared without a dispersing additive in order to avoid dispersant displacement or competing reactions on the pigment surfaces.

Preparation:

In accordance with the above formulations, the ingredients of each formulation were weighed into 250 ml glass vessels with screw-top lids, and glass beads (100 g of glass beads per 100 g of millbase) were added. The sealed vessels were subsequently shaken in a Skandex mixer (Skandex; model: BA-S20) at 620 rpm and 40° C. for 2 h. Subsequently the glass beads are separated from the liquid formulation using a sieve.

Viscosity Measurement:

The rheological behavior of the UV-curable flexographic printing ink thus prepared is determined using a rotational viscometer. The measurement system chosen was a cone and plate system (Euro Physics, Rheo 2000 RC20, 45 µm, 25° C. measurement temperature).

The following rate program was chosen:
10 to 100 1/s in 30 s
100 to 1000 1/s in 40 s
1000 to 100 1/s in 40 s
100 to 10 1/s in 30 s A program of this kind was chosen in order to indicate any flow anomalies (e.g., thixotropic or pseudoplastic flow behavior). For comparison of the samples with one another the viscosity figures measured at the shear gradient of 1000 $s^{-1}$ were used and the figures at 100 $s^{-1}$ of the outgoing curve and the return curve.

Tinted UV-curable flexographic ink:

For better assessment of the color strength subsequently, the UV-curable flexographic ink was blended with the white tinting paint. The blends were made in a ratio of 20:1 (39.1 g of white pigment to 1 g of pigment). The mixture was subsequently homogenized in a universal shaker (Hausschild Engineering, DAC 150 Dual Asymmetric Centrifuge) for 30 minutes.

Application:

The tinted UV-curable flexographic inks were knife-coated onto black/white card (Leneta) using an applicator (24 µm). Drying took place using a 120 W/cm medium-pressure mercury vapor lamp (Beltron GmbH, Beltron UV lamp). The speed of the conveyor belt was 3 m/min.

Test Methods:

In order to evaluate the performance of the dispersants the color strength achieved, the rub-out, the viscosity, and the rheological behavior were combined.

Colorimetry:

Colorimetry took place using an instrument from the company X-Rite (model: X-Rite SP 60) on the white portion of the black/white card. For all samples the L*a*b* values were determined in accordance with the CIE-Lab Systems (CIE=Commission Internationale de l'Eclairage). The CIE-Lab system is useful as a three-dimensional system for the quantitative description of color loci. On one axis in the system the colors green (negative a values) and red (positive a values) are plotted, on the axis at right angles thereto the colors blue (negative b values) and yellow (positive b values). The two axes intersect one another at the achromatic point. The vertical axis (achromatic axis) is relevant for the lightness, from white (L=100) to black (L=0). Using the CIE-Lab system it is possible not only to describe color loci but also color spacings, by stating the three coordinates.

Rub-Out:

In order to make visible and measurable the vertical floating, in particular, of pigments in coating films, the test known as the rub-out test is carried out. The coating film is rubbed with the finger or a brush before it has cured. If the pigments have undergone separation or are in a highly flocculated condition, the mechanical operation of rubbing forces them back into homogeneous distribution. The target shade of the homogeneous mixture is produced. The rub-out is reported as the difference in color from the unrubbed film. The smaller the rub-out value or of the difference in color, the better the pigment is stabilized in the coating, printing ink and/or print varnish.

The values reported in the results tables are in each case average values from three measurements.

Results:

TABLE 3

Comparison in UV-curable flexographic ink with pigment Raven ® 450

| Dispersant | L* | Rub-Out ΔL* | Viscosity (mPas) | Rheology |
|---|---|---|---|---|
| Blank sample, no dispersant | 79.6 | 20.1 | 657 | non-newtonian |
| Silikophtal ® HTL-2 | 58.1 | 0.5 | 600 | newtonian |
| Silikophtal ® HTF | 58.7 | 0.5 | 550 | newtonian |
| Silikophtal ® HTL | 57.6 | 0.4 | 557 | newtonian |
| Silikophtal ® HTS | 57.9 | 0.4 | 502 | newtonian |
| Amino-functional silicone resin | 57.7 | 0.4 | 688 | newtonian |
| Solsperse ® 24000 | 59.1 | 2.0 | 725 | non-newtonian |
| Disperbyk ® 168 | 70.7 | 11.1 | 303 | solvent |
| Texaphor ® P-61 | 56.0 | 1.3 | 313 | solvent |

The desire here is for low L*, low rub-out values, and a low viscosity in combination with newtonian flow behavior. It is found that the silicone resins used in accordance with the invention exhibit lower L* values lower rub-out ΔL*, and an improved viscosity behavior as compared with the noninventive dispersants of the prior art.

The positive properties of the silicone resins used in accordance with the invention are not limited to black pigments alone but instead extend to the other solids commonly used in the prior art. The skilled worker is aware, for example, that organic yellow pigments in particular, such as diarylide yellow pigments, are difficult to disperse. Below, therefore, the yellow pigment Irgalite® Yellow BAW (Ciba) is used as an example of the universal applicability of the silicone resins and dispersants.

TABLE 4

Comparison in UV-curable flexographic ink with pigment Irgalite ® Yellow BAW

| Dispersant | b* | Rub-Out Δb* | Viscosity (mPas) | Rheology |
|---|---|---|---|---|
| Blank sample, no dispersant | 26.0 | 28.8 | 901 | non-newtonian |
| Silikophtal ® HTL-2 | 43.2 | 12.4 | 692 | newtonian |
| Amino-functional silicone resin | 52.4 | 2.3 | 523 | newtonian |
| Solsperse ® 24000 | 51.6 | 2.6 | 549 | non-newtonian |
| Disperbyk ® 168 | 50.5 | 2.4 | 463 | solvent |
| Texaphor ® P-61 | 55.8 | 2.1 | 552 | solvent |

The desire here is for high b*, low rub-out values, and a low viscosity in combination with newtonian flow behavior. It is found that the silicone resins used in accordance with the invention, especially the amino-functional silicone resin, exhibit a newtonian flow behavior and low viscosities as compared with the noninventive dispersants of the prior art.

The above description is intended to be illustrative and not limiting. Various changes or modifications in the embodiments described herein may occur to those skilled in the art. These can be made without departing from the scope and spirit of the invention.

What is claimed is:

1. A method for dispersing a pigment in a medium which comprises adding to said medium at least one silicone resin which is obtained by reacting
   a) an alkoxysiloxane of the general formula

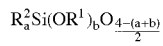

where
   $R^1$ is a lower alkyl group,
   $R^2$ is an alkyl or phenyl group,
   a is from 1.0 to 1.2,
   b is from 0.5 to 1.0,
   with the proviso that at least 50% by weight corresponds to the formula
   $[R^2Si(OR^1)O]_n$, n=3 to 8,
   with
   b) one or more hydroxyl-containing polyesters,
   and, optionally,
   c) one or more low molecular weight alcohols,
   wherein it is possible for the alkoxysiloxane to be reacted partly or fully, based on the amount of $(OR^1)$ groups in a), but the reaction being taken at least to the point where a clear solution is obtained.

2. The method according to claim 1 wherein $R^1$ is a $C_1$–$C_4$ group.

3. The method according the claim 1 wherein $R^1$ is an ethyl radical.

4. The method according to claim 1 wherein $R^2$ a phenyl radical.

5. The method according to claim 1 wherein $R^1$ is an ethyl radical and $R^2$ is a phenyl radical.

6. The method according to claim 1, wherein the hydroxyl-containing polyester is the reaction product of at least one dicarboxylic acid or derivative thereof and at least one diol.

7. The method according to claim 1, wherein the hydroxyl-containing polyester is the reaction product of at least one hydroxycarboxylic acid and/or its lactone and at least one diol.

8. The method according to claim 1, wherein the hydroxyl-containing polyester has a molar mass of from about 100 to about 10,000 g/mol.

9. The method according to claim 1, wherein the low molecular weight alcohol is a monohydric to tetrahydric alcohol or an amino alcohol.

10. The method according to claim 1, wherein the medium is a liquid.

11. The method according to claim 1, wherein the medium is a solid.

12. The method according to claim 1, wherein the pigment is an inorganic pigment selected from the group consisting of carbon blacks, titanium dioxide, zinc oxide, Prussian blue, iron oxides, cadmium sulfide, chromium pigment and sulfates of lead, zinc, barium, calcium and mixtures thereof or an organic pigment selected from the group consisting of azo, diazo, condensed azo, naphtol, metal complex, thioindigo, indanthrone, isoindanthrone, anthanthrone, anthraquinone, isodibenzanthrone, triphendioxazine, quinacridone, perylene, diketopyrrolopyrrole, and phthalocyanine pigments.

13. The method according to claim 1, wherein the solid is a filler.

14. The method according to claim 13, wherein the solid is selected from the group consisting of talc, kaolin, silicas, barytes, lime, oxides, silicates, zirconium oxides, titanium oxides, boron nitrides, silicon nitrides, boron carbides, mixed silicon-aluminum nitrides, metal titanates, magnetic oxides of transition metals, cobalt-doped iron oxides, ferrites, metals, and the alloys thereof, biocides, agrochemicals, and drugs.

15. The method according to claim 1, wherein a low molecular weight alcohol is present and is selected from the group consisting of methanol, ethanol, propanol, isopropanol, 2-butanol, isobutanol, hexanol, dodecanol, ethylene glycol, propylene glycol, butanediol, hexanediol, diethylene glycol, dipropylene glycol, trimethylolethane, trimethylolpropane, pentaerythritol, ditrimethylolpropane, hexahydric alcohols, such as methanol, ethanol, propanol, isopropanol, 2-butanol, isobutanol, hexanol dodecanol, ethylene glycol, propylene glycol, butanediol, hexanediol, diethylene glycol, dipropylene glycol, trimethylolethane, trimethylolpropane, pentaerythritol, ditrimethylolpropane, alcohols, dipentaerythritol, 2-aminoethanol, 2-(2-aminoethylamino)ethanol, triethanolamine, diethanolamine, propanolamine, 2-amino-1,3-propanediol, 2-aminoisobutanol, aminohexanol, aminophenylethanol, and hydroxyethylpyridine.

16. A pigment paste which comprises at least one pigment and a silicone resin obtained by reacting a) an alkoxysiloxane of the general formula

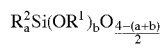

where
R$^1$ is a lower alkyl group,
R$^2$ is an alkyl or phenyl group,
a is from 1.0 to 1.2,
b is from 0.5 to 1.0,
with the proviso that at least 50% by weight corresponds to the formula
[R$^2$Si(OR$^1$)O]$_n$, n=3 to 8,
with
(b) one or more hydroxyl-containing polyesters derived from at least one hydroxycarboxylic acid and/or the corresponding lactone, and at least one diol,
c) one or more low molecular weight alcohols,
wherein it is possible for the alkoxysiloxane to be reacted partly or fully, based on the amount of (OR$^1$) groups in a), but the reaction being taken at least to the point where a clear solution is obtained.

17. A printing ink or paint varnish which comprises a pigment and/or dye, optionally a solvent, and at least one silicone resin obtained by reacting
a) an alkoxysiloxane of the general formula

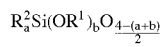

where
R$^1$ is a lower alkyl group,
R$^2$ is an alkyl or phenyl group,
a is from 1.0 to 1.2,
b is from 0.5 to 1.0,
with the proviso that at least 50% by weight corresponds to the formula
[R$^2$Si(OR$^1$)O]$_n$, n=3 to 8,
with
(b) one or more hydroxyl-containing polyesters derived from at least one hydroxycarboxylic acid and/or the corresponding lactone, and at least one diol,
c) one or more low molecular weight alcohols,
wherein it is possible for the alkoxysiloxane to be reacted partly or fully, based on the amount of (OR$^1$) groups in a), but the reaction being taken at least to the point where a clear solution is obtained.

18. The printing ink or paint varnish according to claim 17, wherein the pigment is carbon black.

19. A coating which comprises at least one solid, optionally a solvent, and at least one silicone resin obtained by reacting
a) an alkoxysiloxane of the general formula

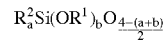

where
R$^1$ is a lower alkyl group,
R$^2$ is an alkyl or phenyl group,
a is from 1.0 to 1.2,
b is from 0.5 to 1.0,
with the proviso that at least 50% by weight corresponds to the formula
[R$^2$Si(OR$^1$)O]$_n$, n=3 to 8,
with
(b) one or more hydroxyl-containing polyesters derived from at least one hydroxycarboxylic acid and/or the corresponding lactone, and at least one diol,
c) one or more low molecular weight alcohols,
wherein it is possible for the alkoxysiloxane to be reacted partly or fully, based on the amount of (OR$^1$) groups in a), but the reaction being taken at least to the point where a clear solution is obtained.

20. The coating according to claim 19 which is a pigmented UV curable coating which comprises carbon black as the pigment.

* * * * *